US005485577A

United States Patent [19]

Eyer et al.

[11] Patent Number: 5,485,577

[45] Date of Patent: Jan. 16, 1996

[54] METHOD AND APPARATUS FOR INCREMENTAL DELIVERY OF ACCESS RIGHTS

[75] Inventors: Mark K. Eyer, San Diego; Paul Moroney, Olivenhain, both of Calif.

[73] Assignee: General Instrument Corporation of Delaware, Chicago, Ill.

[21] Appl. No.: 358,340

[22] Filed: Dec. 16, 1994

[51] Int. Cl.$^6$ .................................................. H04L 9/00
[52] U.S. Cl. ........................... 395/188.01; 380/3; 380/45
[58] Field of Search .................................. 395/575, 425, 395/726, 731, 732, 188.01; 380/3, 4, 45, 47, 21, 44

[56] References Cited

U.S. PATENT DOCUMENTS

| | | | |
|---|---|---|---|
| 4,613,901 | 9/1986 | Gilhousen et al. | 358/122 |
| 4,864,615 | 9/1989 | Bennett et al. | 380/21 |
| 5,111,504 | 5/1992 | Esserman et al. | 380/21 |
| 5,115,467 | 5/1992 | Esserman et al. | 380/44 |
| 5,134,700 | 7/1992 | Eyer et al. | 395/425 |
| 5,164,986 | 11/1992 | Bright et al. | 380/21 |
| 5,404,403 | 11/1995 | Bright et al. | 380/21 |

OTHER PUBLICATIONS

K. Kelkar, Access Control Requirements in a Mature Pay Television Industry, 1992, pp. 229–231, Broadcasting Convention 1992, IEE Conference Pub. 358.

*Primary Examiner*—Robert W. Beausoliel, Jr.
*Assistant Examiner*—Norman M. Wright
*Attorney, Agent, or Firm*—Barry R. Lipsitz

[57] ABSTRACT

Incremental delivery of authenticated access rights to an access control processor is provided. Subgroups of the access rights are communicated to the processor in a plurality of messages. The subgroups are stored in different data banks within the processor, and validity designations associated with the data banks indicate whether the data currently stored therein has been authenticated under a cryptographic key currently in use. Access under a particular key is limited to that provided by access rights contained in storage banks having a validity designation in a valid state for that key.

8 Claims, 7 Drawing Sheets

FIG. 7c

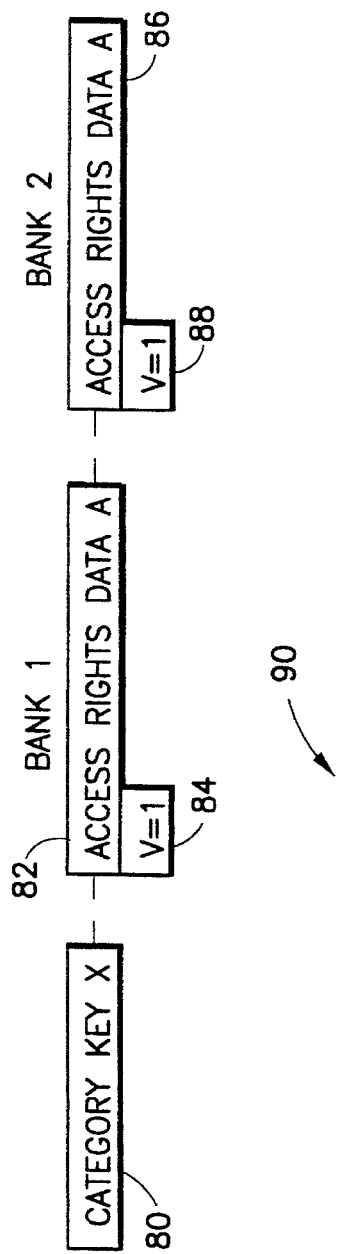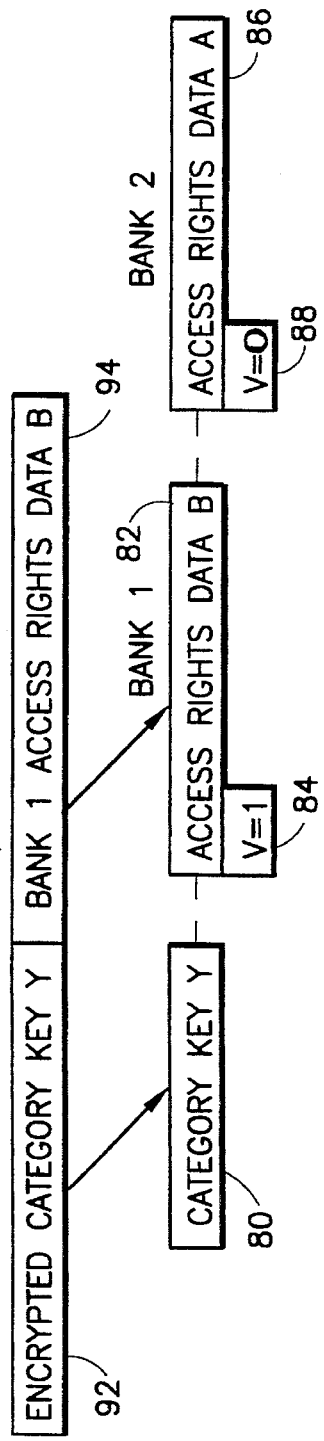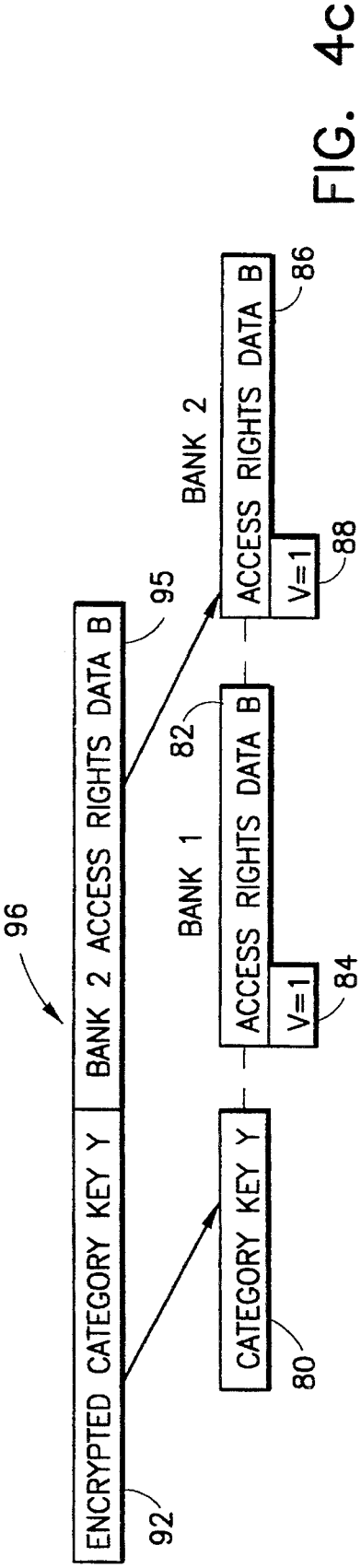

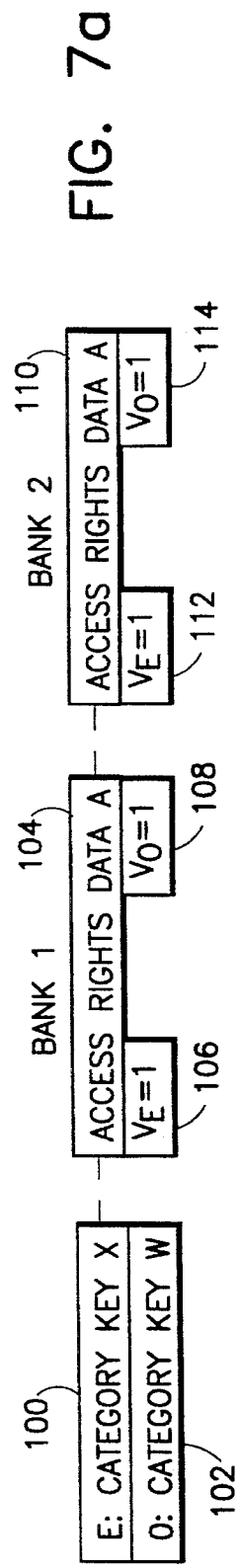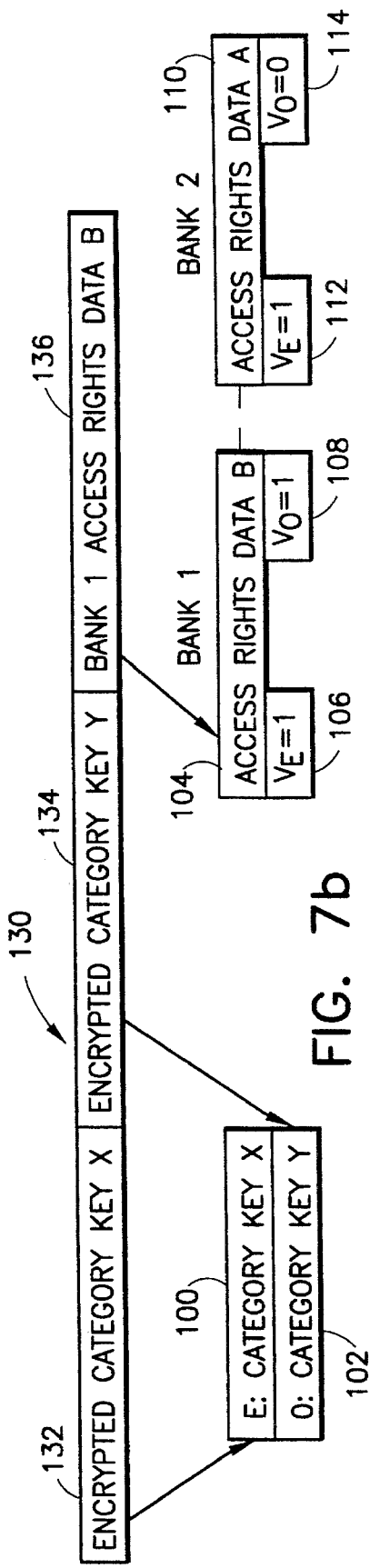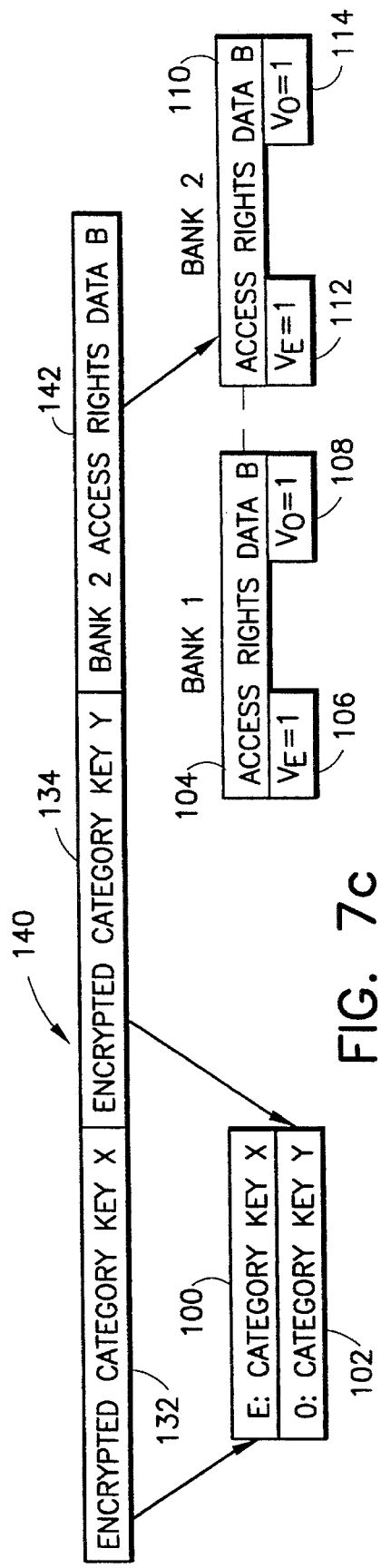

5,485,577

METHOD AND APPARATUS FOR INCREMENTAL DELIVERY OF ACCESS RIGHTS

BACKGROUND OF THE INVENTION

The present invention relates generally to security apparatus for information processing systems, and more particularly to the incremental delivery of authenticated access rights to an access control processor. The invention is particularly useful in connection with the secure transmission of premium television services via satellite or cable, but is not limited to such applications.

There are many schemes available for controlling access to electronic signals, such as those providing premium television services. Such schemes are necessary to maintain security, for example in subscription television systems such as cable television and satellite television systems. Typically, a system subscriber is provided with a decoder connected between a television signal source (e.g., cable feed or satellite receiver) and a television set. Each subscriber's decoder is remotely accessed by the system operator to enable or disable the receipt of specific services such as the Home Box Office (HBO) movie channel or special pay-per-view sports events. One problem with such systems is that "pirates" may attempt to break the system security and sell "black boxes" that enable the reception of all programming without paying for the services received. It has been difficult and expensive for system operators to contend with the piracy problem.

Various systems have been designed to make piracy more difficult. One such system is disclosed in U.S. Pat. No. 4,613,901 to Gilhousen, et al. entitled "Signal Encryption and Distribution System for Controlling Scrambling and Selective Remote Descrambling of Television Signals." In the Gilhousen, et al. scheme, various cryptographic keys are used to provide an encrypted television signal. Among the keys described are category keys, each common to a different subset of subscriber decoders. It is also known to provide program keys, in which each television program has a specific key associated therewith that is necessary to descramble or decrypt the particular program signal.

U.S. Pat. No. 5,115,467 to Esserman, et al. entitled "Signal Encryption Apparatus for Generating Common and Distinct Keys" also deals with the security issue. The generation of various different types of keys and their use is disclosed in the patent.

An example of a prior art communication system using encrypted category keys and program keys is the VideoCipher® II+ scrambling system produced and licensed by General Instrument Corporation of San Diego, Calif. to provide encrypted satellite television communication. The encrypted category key is derived from a category key, a unit key specific to a subscriber decoder, and access rights defining which services the particular subscriber is entitled to receive. The access rights are authenticated in the category key, which generally changes monthly.

In the VideoCipher II+ system, and other known systems, it has been necessary to provide the authenticated access rights with the encrypted category key in a single "category rekey" message. The access rights may be many bytes in length. Each category rekey message has a limited length. For example, category rekey messages in a particular system may be limited to two hundred bytes. Such limitations are typically required by the size of the buffer (e.g, RAM) which receives the message in the access control processor. If the number of bytes required to define access rights were to become too large, a single category rekey message could not hold the full description.

It would be advantageous to provide an access control system in which access rights can be delivered incrementally, in more than one category rekey message. It would be further advantageous to provide such a system that would operate even after only a partial set of access rights has been received. It would be still further advantageous to provide such a system that can receive partial sets of access rights in any order, without adversely affecting system operation.

The present invention Provides a system for incrementally delivering access rights having the aforementioned and other advantages.

SUMMARY OF THE INVENTION

In accordance with the present invention, a method is provided for incrementally delivering authenticated access rights to an access control processor. Data defining the access rights is divided into a plurality of subgroups. The subgroups are transmitted to the processor as authenticated data in a plurality of messages. A current cryptographic key is derived using the authenticated data contained in a current message upon receipt of that message by the processor. Each of the subgroups is stored in a corresponding storage bank of the processor. Each of the storage banks has a validity designation associated therewith for said cryptographic key. The current cryptographic key is Compared to a cryptographic key from a prior message under which subgroups stored in the storage banks were authenticated to determine if the keys match. If the keys match, the validity designation for that key is set to a valid state for each storage bank that is storing data authenticated by the current message, without changing the key's validity designation for any other storage bank. If the keys do not match, the validity designation for that key is set to a valid state for each storage bank that is storing data authenticated by the current message, and the validity designation for that key is set to an invalid state for all other storage banks. As used herein, the act of setting a validity designation to a valid state is intended to include the act of simply maintaining or leaving unchanged a validity designation that is already in the valid state. Likewise, setting a validity designation to an invalid state may only require that a prior invalid state be maintained without actually resetting the validity designation. Access (e.g, to particular television programs) under the current cryptographic key is limited to that provided by access rights contained in storage banks having a validity designation in a valid state for that key.

In one implementation of the present invention, first and second different cryptographic keys under which access rights are authenticated are maintained by the access control processor at the same time. Each of the storage banks is provided with a first validity designation for the first key and a second validity designation for the second key. Access via a particular one of the keys is limited to that provided by access rights contained in storage banks having a validity designation in a valid state for that key.

One or more of the plurality of messages can carry a replacement for one of the first and second keys, together with one or more subgroups authenticated under the replacement key. Each of the subgroups transmitted with the replacement key is stored in a corresponding one of the storage banks. The validity designation for the replacement key is set to a valid state for those storage banks holding a subgroup authenticated under the replacement key. The validity designation for the replacement key is set to an invalid state for those storage banks holding a subgroup that was not authenticated under the replacement key. The validity designation for the key that was not replaced will remain unchanged for those storage banks holding a subgroup authenticated under that key. The validity designation for the key that was not replaced is set to an invalid state for those storage banks holding a subgroup that was not authenticated under that key. The message carrying the replacement key can also carry a duplicate of the key that was not replaced. In a preferred embodiment, replacement keys are transmitted on a periodic basis. For example, a new "category key" for use during the next month can be transmitted while the category key for the current month is still maintained by the access control processor.

The present invention also provides an access control processor for incrementally receiving authenticated access rights. The access control processor includes means for receiving a plurality of messages containing subgroups of access control data defining the access rights. Means are provided for deriving a cryptographic key using the authenticated data contained in a current one of the messages upon receipt of that message. A plurality of storage banks is provided for storing different ones of the subgroups. Each of the storage banks has a validity designation associated therewith for the cryptographic key. A comparator is provided for comparing the cryptographic key to a cryptographic key under which data contained in the storage banks was authenticated to determine if the keys match. Means responsive to the comparing means set the validity designation for the key to a valid state for each storage bank that is storing data authenticated by the current message, without changing the validity designation of any other storage bank, if the keys match. Means responsive to the comparing means set the validity designation for the key to a valid state for each storage bank that is storing data authenticated by the current message, and for setting the validity designation for that key to an invalid state for all other storage banks if the keys do not match. Access under the cryptographic key is limited to that provided by access rights contained in storage banks having a validity designation in a valid state for that key.

The processor can maintain first and second different cryptographic keys under which access rights are authenticated. A first validity designation is maintained for the first key and a second validity designation is maintained for the second key for each of the banks. Access via a particular one of the keys is limited to that provided by access rights contained in storage banks having a validity designation in a valid state for that key.

A replacement can be provided for one of the first and second keys together with one or more subgroups authenticated under the replacement. In such an embodiment, the apparatus of the present invention further comprises means for storing each of the subgroups transmitted with the replacement key in a corresponding one of the storage banks. Means are provided for setting the validity designation for the replacement key to a valid state for those storage banks holding a subgroup authenticated under the replacement key. Means are provided for setting the validity designation for the replacement key to an invalid state for those storage banks holding a subgroup that was not authenticated under the replacement key. Means are also provided for setting the validity designation for the key that was not replaced to an invalid state for those storage banks holding a new subgroup that was authenticated under the replacement key and differs from the previous subgroup stored in that storage bank.

BRIEF DESCRIPTION OF THE DRAWINGS

FIGS. 4a to 4c are diagrammatic illustrations used to show how access rights are incrementally distributed in accordance with the present invention;

FIGS. 7a to 7c illustrate an example in which two different subgroups of access rights are incrementally delivered and authenticated under two category keys.

DETAILED DESCRIPTION OF THE INVENTION

Figure 1:
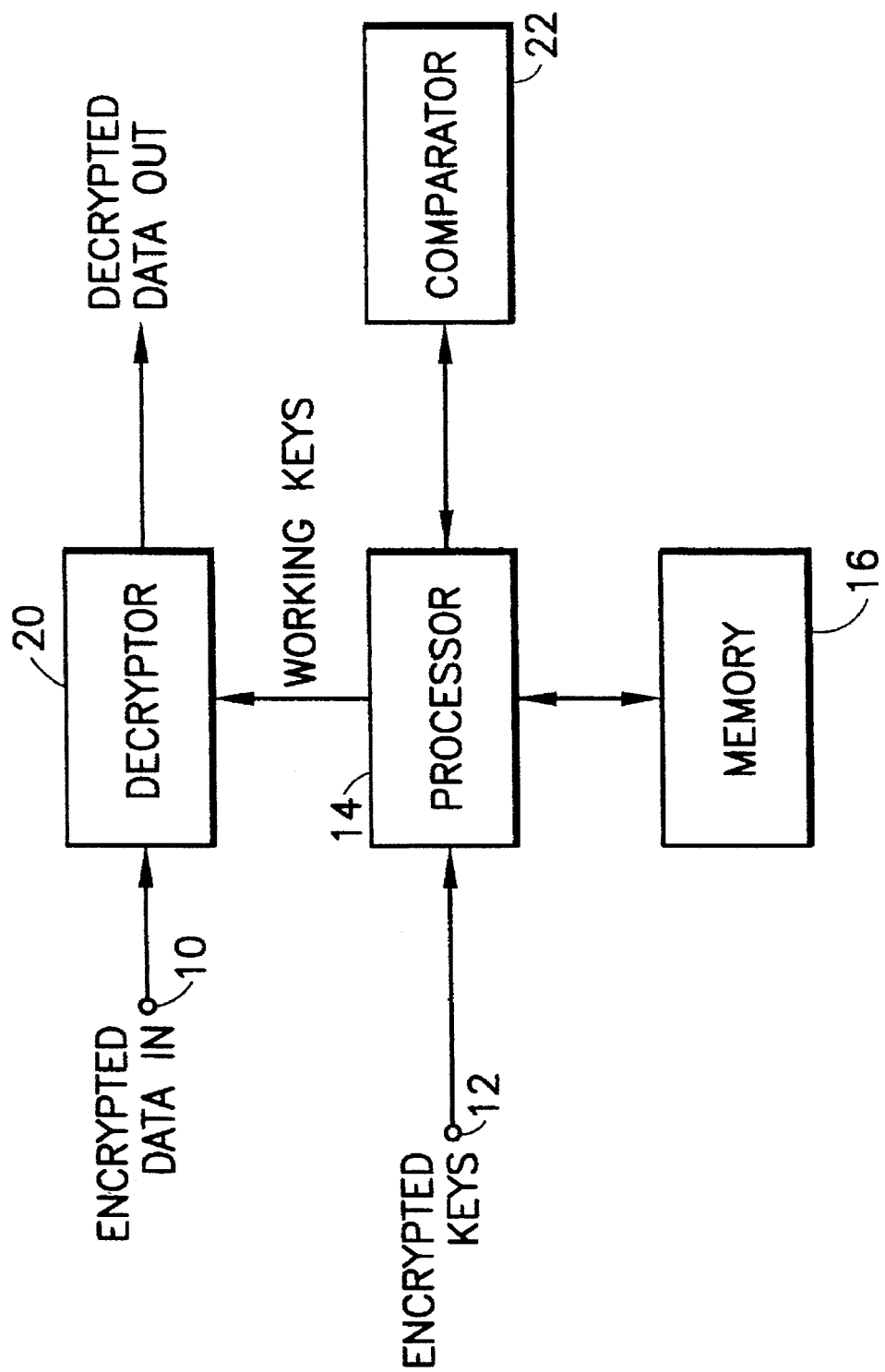
FIG. 1 is a block diagram of an access control processor in accordance with the present invention.

FIG. 1 illustrates a secure access control processor that can be used, for example, to receive and decrypt digital television signals in accordance with the present invention. The signals to be decrypted are input via terminal 10 to a decryptor 20. The decryptor receives working keys necessary to decrypt the input data from a processor. The processor addresses memory 16 in a conventional manner, in order to store various data including decrypted keys, access rights and validity designations as described in more detail below. Encrypted keys are input to the processor 14 via terminal 12. A comparator 22 is provided in accordance with the present invention in order to compare a newly derived key with a prior key stored in memory 16. This comparison is used in order to set the state of the validity designations mentioned above.

Figure 2:
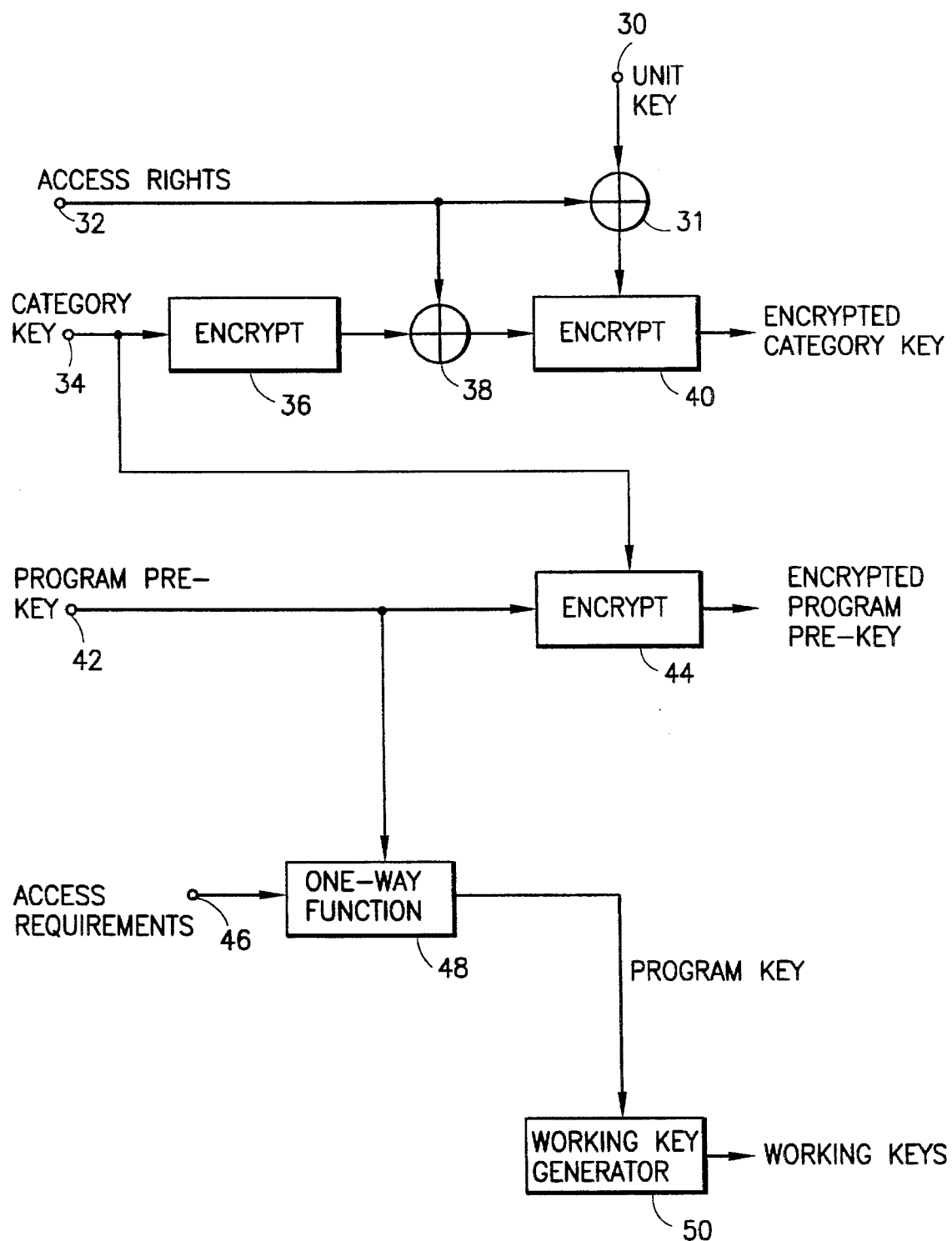
FIG. 2 is a block diagram illustrating, in simplified form, an example of a key hierarchy that can be used by an uplink processor to provide cryptographically secure data for transmission.

FIG. 2 describes, in simplified form, a key hierarchy that can be used for key encryption, e.g., at a satellite uplink. A unit key which is specific to a particular subscriber decoder is input via terminal 30 to an exclusive OR (XOR) function 31 which also receives access rights via terminal 32. Access control involves defining, on a unit by unit basis, the access rights granted to that particular unit. Access rights are authenticated in a "category key," which changes periodically, for example on a monthly basis. Each program, which represents a time slice from one service such as HBO, defines specific "access requirements" which must be present in order to grant the right to decrypt that program. The access requirements are authenticated in a "program key" which is valid for the duration of the program. An access control processor regularly receives "category rekey" messages defining its set of access rights.

The unit key for a particular subscriber decoder is derived from quantities stored in a secure random access memory (RAM) at the time the access control processor within the decoder is manufactured.

The access rights input via terminal 32 are also XOR'ed via XOR 38 with a category key input via terminal 34 and encrypted in a first encryption circuit 36. As indicated above, the category key is changed on a periodic basis. One specific category key is delivered, in an encrypted form, to a subset of the full population of decoders. The operation used to encrypt the category key is invertible. The property of invertability plus knowledge of unit keys allows a system operator to prepare an encrypted category key that will result in a desired category key.

As shown in FIG. 2, the encrypted category key is provided by an encryption circuit 40 that receives the outputs of XOR's 31 and 38 as inputs. Thus, the encrypted category key is dependent on the unit key and category key and authenticates the access rights.

The encoder also provides an encrypted program pre-key that is required by the decoder in order to derive the program key for the program. The program pre-key is input via terminal 42 to an encryption circuit 44 that encrypts the program pre-key under the category key to provide the encrypted program pre-key.

The program pre-key is also input to a one-way function 48 which receives the access requirements for the particular program via terminal 46. The one-way function combines the program pre-key and access requirements to provide the program key necessary to generate working keys via a working key generator 50, in a conventional manner. Working keys are simply keys that vary with time, dependent upon the program key. Minimizing re-use of working keys throughout a program defends against certain cryptographic attacks. The working key is applied as an initializing key to decrypt the digital data comprising the digital service being access controlled. Such decryption typically uses a cipher-block-chaining (CBC) approach.

Figure 3:
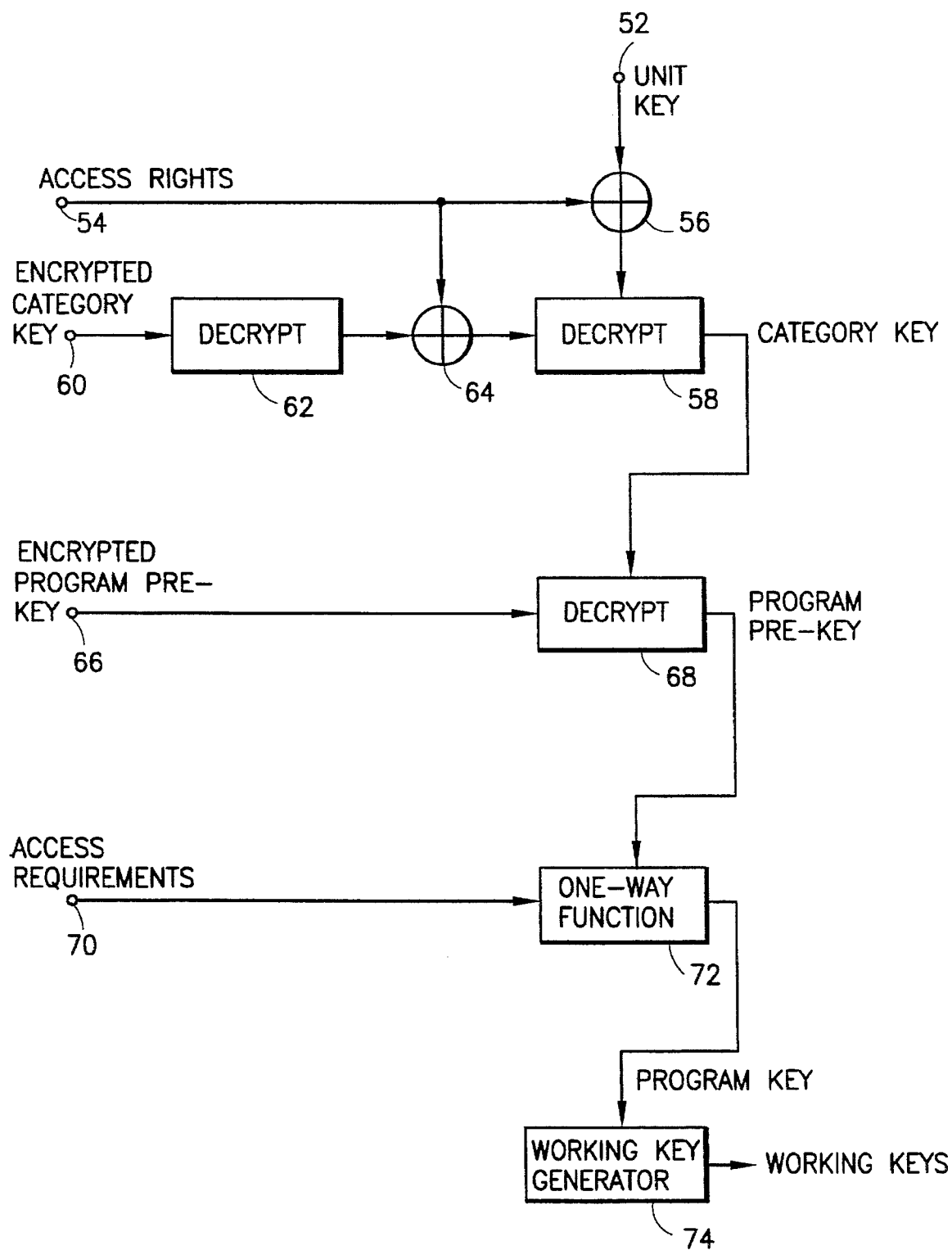
FIG. 3 is a block diagram illustrating, in simplified form, an example of a key hierarchy that can be used for decryption of the cryptographically secure data at a decoder.

FIG. 3 illustrates an example of a key hierarchy that can be used for the decoder processing at the category and program key levels. The access rights input via terminal 54 are XOR'ed in an XOR 56 with the unit key for the particular decoder input via terminal 52. The result is input to a decryption circuit 58 which receives the XOR of the access rights and the output of a decryption circuit 62. The decryption circuit 62 partially decrypts the encrypted category key received via terminal 60. Assuming that the access rights and unit key match those values used in the encryption process, the output of decryption circuit 58 will be the same category key that was encrypted.

The recovered category key is used to decrypt the encrypted program pre-key input via terminal 66 to decryption circuit 68. This provides the program pre-key for input to one-way function 72. The access requirements for the program to which the program pre-key corresponds are input to one-way function 72 via terminal 70. This enables the program key to be recovered for use by working key generator 74 in generating the working keys necessary to decipher the program.

In practice, the access rights and access requirements data blocks may be many bytes in length. Thus, the XOR, decrypt/encrypt, and one-way function operations will typically be cascaded and repeated enough times in an actual implementation so that all data is factored in. For example, the data blocks may have eight-byte data and seven-byte keys or may embody other cryptographic algorithms, as desired. The use of eight-byte data blocks and seven-byte keys is conventional in the Data Encryption Standard (DES) algorithm, details of which can be found in Federal Information Processing Standards Publication 46 ("FIPS Pub. 46") issued by the National Bureau of Standards, U.S. Department of Commerce, "Announcing The Data Encryption Standard," Jan. 15, 1977 and FIPS Pub. 74, "Guidelines for Implementing and Using the NBS Data Encryption Standard," Apr. 1, 1981.

When the number of bytes required to define access rights becomes large enough, one single category rekey message cannot hold the full description. The limitation on category rekey length may be, for example, two hundred bytes. The present invention overcomes this message length limitation by delivering the access rights in an incremental manner. More particularly, the present invention breaks access rights down into a plurality of data subgroups stored in "banks." Each instance of the category rekey message carries one or more subgroups, up to the limitation of the length of the message. Each subgroup is stored in a respective bank in secure RAM in the access control processor along with at least one "validity bit", used by the access control processor to keep track of the state of the bank. When the validity bit is set to a "valid" state (e.g., validity bit set), it indicates that the bank holds data that can be used to match access requirements and grant authorization. When the validity bit is set to an "invalid" state (e.g, validity bit clear), it indicates that the data in the bank cannot be used to grant authorization.

Whenever a category rekey message arrives in the access control processor, it is processed as follows:

1. The category key is derived;

2. If the category key matches the previously delivered category key exactly, then any banks authenticated in the derivation of the current category key are marked valid and the validity bits associated with banks not involved in the derivation are left unchanged.

3. If the category key does not exactly match the previously delivered category key, then any banks authenticated in the derivation of the current category key are marked valid, but validity bits associated with any banks not involved in the derivation are set to the invalid state. The new category key is stored.

This process enables the incremental delivery of access rights, while retaining cryptographic security in the authentication of the access rights data delivered. A key element of the inventive approach is that if the current category key exactly matches the previous category key, the banks previously authenticated under the previous key and validated can remain validated. In this manner, later messages effectively build upon prior messages.

Since any changes to access rights will affect the resulting derivation of the category key, any attempt to tamper with the content of one's access rights data in order to steal services (i.e., a pirate attack) will prevent a key match from occurring. Thus, the prior banks' data will become invalid upon derivation of the incorrect category key.

The data labeled as "access rights" in FIGS. 2 and 3 does not have to exactly comprise the access rights data ultimately stored in secure memory. The actual data validated may be the instructions used to define the data as it will be stored. The category rekey message may deliver data structures which include control bytes indicating the format of data blocks to follow. The control byte may, for example, indicate that the bank indicated by the preceding field is to be cleared to zero, or that the bank data to follow is a list of bits to be set instead of a bit mask. Given that the control bytes and parameters are authenticated, the result of the expansion or processing of the instructions is also authenticated.

FIGS. 4a to 4c illustrate an example in which access rights data are delivered incrementally in accordance with the present invention. In the initial state illustrated by FIG. 4a, the access control processor holds access rights data in two banks 82, 86. Each bank has a validity designation 84, 88 respectively, associated therewith. In the initial state, the validity designations for both banks are set to a valid state (V=1). The access control processor also holds the key under which the access rights data is authenticated, namely, category key X stored in key store 80.

FIG. 4b illustrates the delivery of a new category key and subgroup of access rights data via a category rekey message generally designated 90. The category rekey message includes an encrypted category key 92 (encrypted category key Y) as well as subgroup 94 of new access rights data. The new category key is stored in key store 80 and the new subgroup of access rights data is stored in bank 82. Subgroup 94 is authenticated under the new category key 92. Thus, when this subgroup is stored in bank 82, the validity designation 84 for bank 82 is set to (i.e., remains) valid. On the other hand, since the new category key (category key Y) does not match the prior category key (category key X), the validity designation 88 for bank 86 is set to an invalid state (V=0). This is necessary because the access rights data (access rights data A) currently stored in bank 86 has not been authenticated under the current category key (category key Y).

FIG. 4c illustrates a subsequent delivery of new access rights data (i.e., subgroup 95) for storage in bank 86. The new access rights data is provided by category rekey message 96, which carries the same encrypted category key 92 (category key Y) that was carried by the previous category rekey -message 90 (FIG. 4b). Since subgroup 95 is authenticated under category key Y, which is stored in key store 80, the validity designation 88 for bank 86 is set to a valid state when subgroup 95 is loaded into bank 86. Since the result of derivation of the category key when authenticating subgroup 95 resulted in the same category key (category key Y) that was already stored in key store 80, the validity designation 84 for bank 82 is unchanged. The result is that both banks are now authenticated under category key Y, even though the access rights subgroups stored in the two banks were delivered separately. It is noted that the subgroups 94 and 95 could have been delivered in the opposite order, with the same end result.

In a preferred embodiment, the access control processor holds two category keys. One category key is used for a current time period (e.g, the current month) and the second is used for a subsequent time period (e.g., the following month). Two keys are required to provide a seamless transition across the month boundary. Such an arrangement allows a system operator to predeliver next month's key without affecting the current month's transactions. In order words, a category key for a subsequent time period can be delivered without creating a period of time where one or more banks are invalidated during the delivery of the new key.

In accordance with the present invention, the maintenance of two category keys with only a single set of banks is permitted by providing a second validity designation for each bank. Each validity designation is associated with (i.e., "points" to) a specific category key. This can be accomplished, for example, either by quoting the sequence number of the category key or by using an even/odd parity scheme.

In a dual key implementation, the processing rules are refined to accommodate the validation bytes for banks already validated by one key when the second key arrives. The category rekey message in such implementations may treat a bank in one of three ways. In particular, the bank may be redefined by the category rekey message, it may be uninvolved in the authentication processing of the message, or the bank may be assumed to be unchanged from a definition received previously, but authenticated in the derivation of the new category key. In the later case, the data in the bank is involved in the encryption/decryption of the category key, but the actual data in the bank is not included in the message.

Figure 5A:
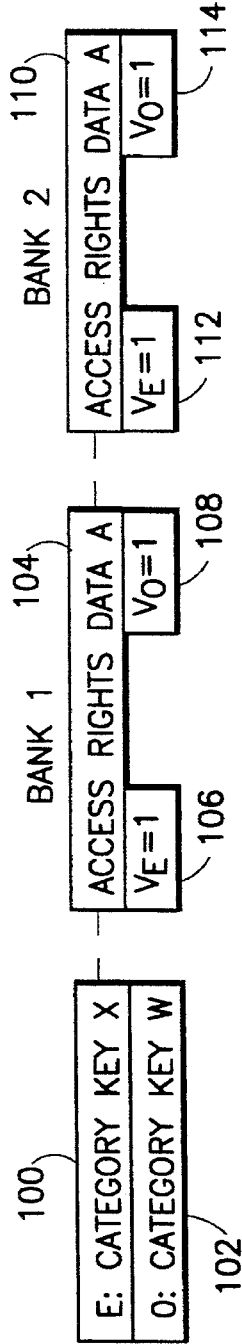
FIGS. 5a to 5b illustrate, in diagrammatic form, a further example of the invention in which a plurality of different cryptographic keys are maintained under which access rights are authenticated and distributed incrementally.
Figure 5B:
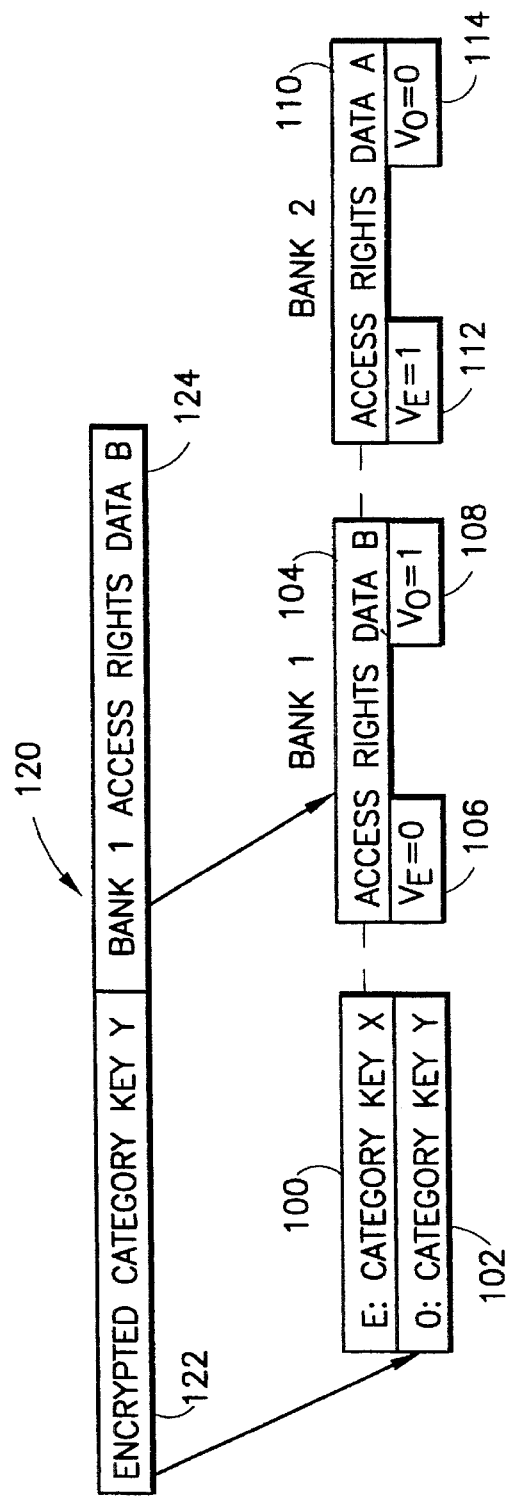
Figure 6A:
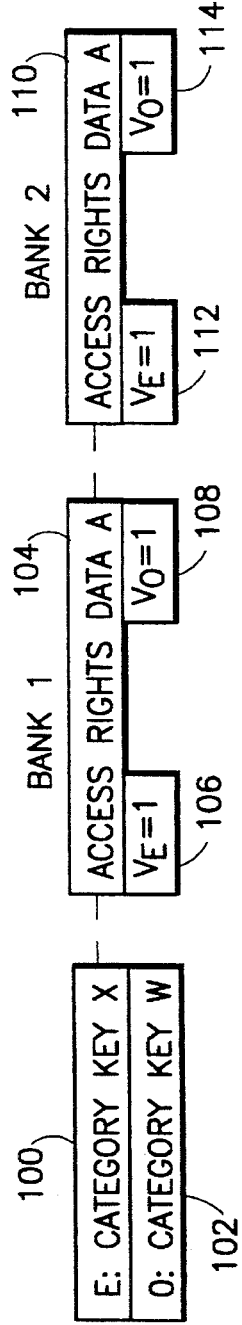
FIGS. 6a to 6b illustrate an example in which a replacement category key is provided with no change in access rights.

Examples for the incremental delivery of access rights where two keys are held by the access control processor are illustrated in FIGS. 5a, 5b; 6a, 6b; and 7a, 7b, 7c. FIGS. 5a and 6a each illustrate the same initial conditions, in which an even category key 100 (category key X) and an odd category key 102 (category key W) are present in the access control processor. A first bank 104 holds a first subgroup of access rights. Two validity designations are associated with this bank. Validity designation 106 pertains to information authenticated under the even key. Validity designation 108 pertains to information authenticated under the odd key. A second bank 110 holds a second subgroup of access rights. The second bank is associated with validity designations 112 and 114. Validity designation 112 pertains to information authenticated under the even key and validity designation 114 pertains to information authenticated under the odd key. In the initial state, all four validity designations are set to a valid state (V=1).

In FIG. 5b, a category rekey message 120 is received which includes a new encrypted category key 122 (category key Y) and a new subset of access rights 124 to be stored in the first bank. Upon receipt of a category rekey message containing a single category key, as illustrated in FIG. 5b, the category key is first derived by decrypting the encrypted category key as illustrated in FIG. 3. The resultant category key is stored in category key store 102. The validity designation for each bank redefined or authenticated by the new category key stored in category key store 102 is set to a valid state. It is noted that any bank which is redefined by a category rekey message is also authenticated under the keys carried by that message.

For each bank redefined by a new category rekey message, the validity designation for the other category key (i.e., the category key that is not contained in the category rekey message) is set to an invalid state. Thus, in FIG. 5b the validity designation 106 for the category key that is not contained in the category rekey message (i.e., "even" category key X stored in key store 100) is set to the invalid state ($V_E=0$). Validity designation 108 is set (i.e., maintained) in a valid state since the "odd" key (category key Y stored in key store 102) was provided by the category rekey message and is the key under which the new access rights stored in the first bank 104 are authenticated.

In the event that the newly derived category key does not exactly match the previous value for that key (i.e., if a new even key does not match the prior even key or if a new odd key does not match the prior odd key), all validity designations associated with that key are set to an invalid state, except for those banks that are redefined and authenticated or simply authenticated by the new category key provided by the category rekey message. It should be noted that the validity designations associated with the other category key are unchanged for any banks authenticated but not redefined in the present message. Thus, in FIG. 5b, after the receipt of a new odd category key (category key Y) under which the access rights stored in the first bank 104 are authenticated, the validity designations 106 and 114 will be set to an invalid state while the validity designations 108 and 112 will remain in a valid state. More particularly, access designation 106 is set to an invalid state because the even key (category key X) was not used to authenticate the access rights stored in first bank 104. Validity designation 114 is set to an invalid state because the access rights stored in second bank 110 were not authenticated under the new odd key (category key Y).

Figure 6B:
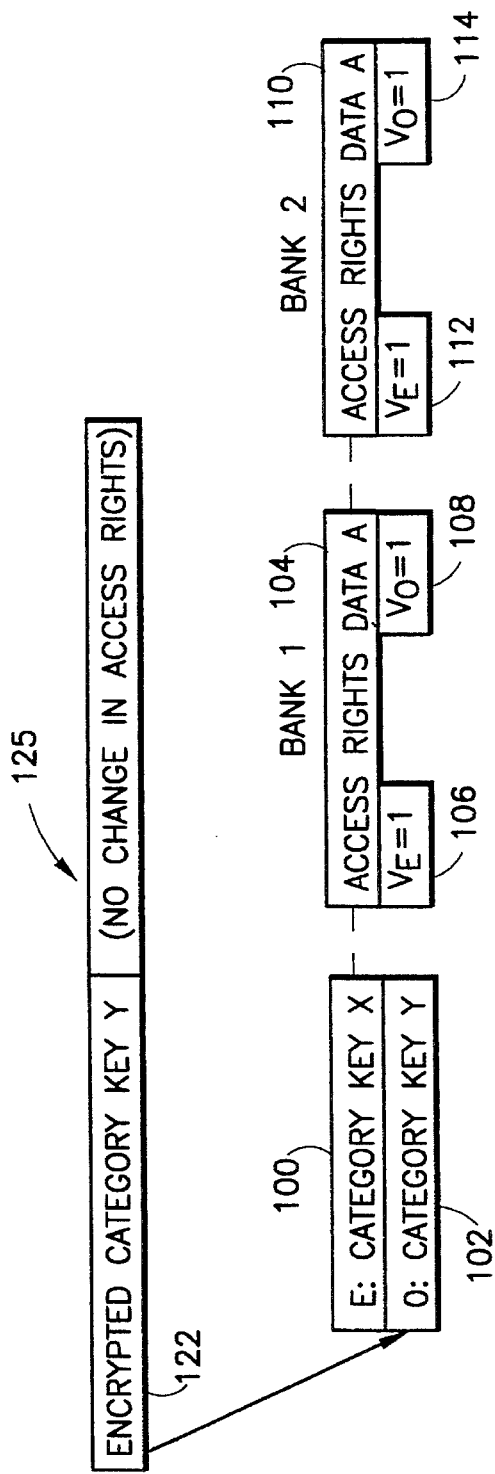

In the example illustrated by FIGS. 6a and 6b, a new odd category key 122 is provided by the category rekey message 125 without any change in the access rights. In this case, both banks are reauthenticated in the delivery of the odd category key. Thus, the validity designations 108 and 114 for the odd key remain in a valid state. Since no banks were redefined, the validity designations 106, 112 for the even key are also unchanged from the initial conditions illustrated in FIG. 6a.

In order to avoid disruption of a current month's authorization if any banks are redefined during delivery of the next month's key, both keys must be delivered in the category rekey message. An example of this is shown in FIGS. 7a through 7c. FIG. 7a shows the same initial conditions illustrated in FIG. 6a.

Whenever two keys are present in the category rekey message, the authenticated data used in the encryption is common to both keys. In other words, the first key cannot be defined to authenticate one bank with the second key authenticating the second bank. If two banks are redefined, both keys must authenticate both banks.

Upon receipt of a category rekey message containing encrypted odd and even category keys, one of the keys (e.g., the even key) is first derived. The validity designations corresponding to the derived key are then set to a valid state for any banks redefined or authenticated by the category rekey message. If the derived key does not exactly match the previous value of that key, then all of the validity designations associated with that key, except for those banks redefined or authenticated thereunder, are set to an invalid state.

After the first category key has been derived and its corresponding validity designations have been set or cleared, the second key is derived. The validity designations for any banks redefined or authenticated in the category rekey message are then set to a valid state for the second key. The derived second key is then compared with the previous value of that key, and absent an exact match, all of the validity designations associated with that key are set to an invalid state except for those banks redefined or authenticated in the current category rekey message.

In the example of FIG. 7b, two keys 132 and 134 are delivered in category rekey message 130, together with new access rights data 136 for the first bank 104. Category key X (derived from encrypted key 132) is the key for the current epoch (i.e., the current month), and is therefore the same key that is already present in the access control processor and stored in key store 100. Category key Y, which is derived from the encrypted key 134 in the category rekey message 130, is a new key for the next epoch and will overwrite the prior category key W in key store 102.

After processing the category rekey message 130, the first bank 104, which stores the new access rights data 136, is validated for both key parities, since the first bank was redefined in the message and authenticated under both the even and odd keys. Thus, validity designations 106 and 108 are both set to a valid state. The validation of the second bank 110 is unchanged for the even key, since category key X as derived from the category rekey message exactly matched the value already held. Validity designation 112 is therefore set to (i.e., remains in) a valid state. The second bank validation is cleared for the odd key, since category key Y as derived from the category rekey message does not match the previous value of category key W held in the odd key store 102. Thus, validity designation 114 is set to an invalid state.

In the example illustrated in FIG. 7c, a Category rekey message 140 arrives redefining the second bank 110. The new category rekey message 140 immediately follows category rekey message 130 of FIG. 7b. After processing this message, all banks become validated for both keys. More particularly, the second bank 110 is validated for both key parities, since that bank was redefined in the message and authenticated under both keys. The validation of first bank 104 is unchanged for the even key, since category key X as derived matched the value already held in key store 100. Similarly, the validation of first bank 104 for the odd key is unchanged, since category key Y as derived from category rekey message 140 exactly matches the previous value held in the odd key store 102.

The final result of the delivery of the two category rekey messages as illustrated in FIGS. 7b and 7c is that both banks are now validated for the new category key (category key Y). The delivery of the two messages could have occurred in either order without affecting the outcome. Furthermore, both banks continued to be validated for the current month's key (category key X) during the delivery process. Thus, no interruption in service results from the incremental delivery of access rights in accordance with the present invention.

It should now be appreciated that the present invention provides a method and apparatus for incrementally delivering authenticated access rights to an access control processor. Data defining the access rights is divided into a plurality of subgroups which are incrementally delivered to an access control processor. Validity designations are used to keep track of authenticated access rights that can be used for providing access to a particular data stream.

Although the invention has been described in connection with various illustrated embodiments, those skilled in the art will appreciate that numerous adaptations and modifications may be made thereto without departing from the spirit and scope of the invention as set forth in the claims.

What is claimed is:

1. A method for incrementally delivering authenticated access rights to an access control processor, comprising the steps of:

dividing data defining said access rights into a plurality of subgroups;

transmitting said subgroups to said processor as authenticated data in a plurality of messages;

deriving a current cryptographic key using the authenticated data contained in a current message upon receipt of said current message by said processor;

storing each of said subgroups in a corresponding storage bank of said processor, each of said storage banks having a validity designation associated therewith for said cryptographic key;

comparing said current cryptographic key to a cryptographic key from a prior message under which subgroups stored in said storage banks were authenticated to determine if the keys match;

if said keys match, setting the validity designation for the matching key to a valid state for each storage bank that is storing data authenticated by said current message, without changing the matching keys' validity designation for any other storage bank; and if said keys do not match, setting the validity designation for the current cryptographic key to a valid state for each storage bank that is storing data authenticated by said current message and setting the unmatching keys' validity designation for all other storage banks to an invalid state;

wherein access under the current cryptographic key is limited to that provided by access rights contained in storage banks having a validity designation for said current cryptographic key in a valid state.

2. A method in accordance with claim 1 wherein first and second different cryptographic keys under which access rights are authenticated are maintained by said processor at the same time, said method comprising the further step of:

providing each of said storage banks with a first validity designation for said first key and a second validity designation for said second key;

wherein access via a particular one of said keys is limited to that provided by access rights contained in storage banks having a validity designation in a valid state for the particular key.

3. A method in accordance with claim 2 comprising the further steps transmitting a replacement for one of said first and second keys in one of said messages together with one or more subgroups authenticated under said replacement;

storing each of the subgroups transmitted with said replacement key in a corresponding one of said storage banks;

setting the validity designation for the replacement key to a valid state for those storage banks holding a subgroup authenticated under the replacement key;

setting the validity designation for the replacement key to an invalid state for those storage banks holding a subgroup that was not authenticated under the replacement key; and setting the validity designation for the key that was not replaced to an invalid state for those storage banks holding a subgroup that was authenticated under the replacement key and differs from the previous subgroup stored in the storage bank holding the subgroup.

4. A method in accordance with claim 3 wherein the message carrying said replacement key also carries a duplicate of the key that was not replaced.

5. A method in accordance with claim 3 comprising the further step of transmitting replacement keys on a periodic basis.

6. An access control processor for incrementally receiving authenticated access rights, comprising:

means for receiving a plurality of messages containing subgroups of access control data defining said access rights;

means for deriving a current cryptographic key using the authenticated data contained in a current one of said messages upon receipt of said current message;

a plurality of storage banks for storing different ones of said subgroups, each of said storage banks having a validity designation associated therewith for said cryptographic key;

means for comparing said current cryptographic key to a cryptographic key under which data contained in said storage banks was authenticated to determine if the keys match;

means responsive to said comparing means when the keys match for setting the validity designation for the current cryptographic key to a valid state for each storage bank that is storing data authenticated by said current message, without changing the matching keys' validity designation for any other storage bank; and means responsive to said comparing means when the keys do not match for setting the validity designation for the current cryptographic key to a valid state for each storage bank that is storing data authenticated by said current message, and for setting the unmatching keys' validity designation for all other storage banks to an invalid state;

wherein access under the current cryptographic key is limited to that provided by access rights contained in storage banks having a validity designation for the current cryptographic key in a valid state.

7. Apparatus in accordance with claim 6 wherein:

said processor maintains first and second different cryptographic keys under which access rights are authenticated;

a first validity designation is maintained for said first key and a second validity designation is maintained for said second key for each of said banks; and access via a particular one of said keys is limited to that provided by access rights contained in storage banks having a validity designation in a valid state for the particular key.

8. Apparatus in accordance with claim 7 wherein a replacement is provided for one of said first and second keys together with one or more subgroups authenticated under said replacement, said apparatus further comprising:

means for storing each of the subgroups transmitted with said replacement key in a corresponding one of said storage banks;

means for setting the validity designation for the replacement key to a valid state for those storage banks holding a subgroup authenticated under the replacement key;

means for setting the validity designation for the replacement key to an invalid state for those storage banks holding a subgroup that was not authenticated under the replacement key;

means for setting the validity designation for the key that was not replaced to a valid state for those storage banks holding a subgroup authenticated under the key that was not replaced; and means for setting the validity designation for the key that was not replaced to an invalid state for those storage banks holding a subgroup that was not authenticated under the key that was not replaced.

* * * * *